US012739120B2

(12) United States Patent
Liu et al.

(10) Patent No.: US 12,739,120 B2
(45) Date of Patent: Sep. 15, 2026

(54) IDENTIFICATION OF TOKEN THRESHOLDS USING MESSAGE SIMULATION

(71) Applicant: Coinbase, Inc., Oakland, CA (US)

(72) Inventors: Li Liu, Scarsdale, NY (US); Zoltan Onodi-Szucs, Brooklyn, NY (US); Indrayana Rustandi, Berkeley Heights, NJ (US); Armin Rezaiean-Asel, Seattle, WA (US); Xiang Li, Kirkland, WA (US)

(*) Notice: Subject to any disclaimer, the term of this patent is extended or adjusted under 35 U.S.C. 154(b) by 140 days.

(21) Appl. No.: 18/513,453

(22) Filed: Nov. 17, 2023

(65) Prior Publication Data

US 2025/0168001 A1 May 22, 2025

(51) Int. Cl.
*H04L 9/32* (2006.01)

(52) U.S. Cl.
CPC .................................. *H04L 9/3213* (2013.01)

(58) Field of Classification Search
CPC ..................................................... H04L 9/3213
See application file for complete search history.

(56) References Cited

U.S. PATENT DOCUMENTS 11,282,139 B1 * 3/2022 Winklevoss ........... G06Q 40/04
11,430,066 B2 * 8/2022 Doney ............... G06Q 20/3827
2019/0130487 A1 * 5/2019 De Beer ................ G06Q 40/06
2019/0266576 A1 * 8/2019 McCauley ........... G06Q 20/065
2021/0056548 A1 * 2/2021 Monica ............ G06Q 20/38215
2021/0097528 A1 * 4/2021 Wang ......................... H04L 9/30
2021/0264421 A1 * 8/2021 Altman .............. G06Q 20/3674
2022/0172195 A1 * 6/2022 Wilson, Jr. ........... G06Q 20/023
2023/0318808 A1 * 10/2023 Osborn ................. H04L 9/3066
713/171
2024/0152911 A1 * 5/2024 Rezaiean-Asel ....... G06Q 20/02
2025/0168001 A1 * 5/2025 Liu ....................... H04L 9/3213

* cited by examiner

*Primary Examiner* — Mohammad A Siddiqi
(74) *Attorney, Agent, or Firm* — Holland & Hart LLP

(57) ABSTRACT

A custodial token platform may implement wallet orchestration techniques. For example, the custodial token platform may process a corpus of transaction data associated with a custodial token platform. The data may indicate withdraw transactions of a plurality of crypto tokens from outbound addresses of the custodial token platform and cold addresses managed by the custodial token platform. The custodial token platform may simulate withdrawal transactions of the plurality of crypto tokens from the outbound addresses and the cold addresses based on the corpus of transaction data. The custodial token platform may determine a ratio between balances of each of the plurality of crypto tokens based on the simulated withdrawal transactions. The ratio between balances of each of the plurality of crypto tokens may be based on a maximum balance of crypto tokens to be stored in the outbound addresses and an average withdrawal time for withdrawal of the crypto tokens.

20 Claims, 12 Drawing Sheets

300

IDENTIFICATION OF TOKEN THRESHOLDS USING MESSAGE SIMULATION

FIELD OF TECHNOLOGY

The present disclosure relates generally to data management, including techniques for identification of token thresholds using message simulation.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

A custodial token platform may support various types of wallets for deposits, withdrawals, and storage. For example, the custodial token platform may generate inbound wallets associated with inbound addresses for user deposits of crypto tokens to accounts associated with the user. The custodial token platform may also use outbound wallets for supporting withdrawals of crypto tokens and cold storage wallets for security. In some examples, a larger balance of crypto tokens stored in the outbound wallets may increase a risk associated with the custodial token platform, which may increase a cost (e.g., an insurance cost) associated with the custodial token platform. However, a smaller balance of crypto tokens stored in the outbound wallets (e.g., and accordingly a larger balance of crypto tokens stored in the cold storage wallets) may increase a delay associated with a user withdrawing the crypto tokens. For example, withdrawal transactions of tokens without liquidity to support withdrawals in the outbound wallets may be associated with a longer withdrawal time than withdrawal transactions of tokens with liquidity in the outbound wallets. That is, if the outbound wallets do not have enough liquidity to support withdrawal, then crypto tokens may be transferred from the cold wallet to the outbound wallets, then to the user withdrawal address, which may result in increased withdrawal times due to blockchain network functionality and a time associated with restore transactions between the cold wallet to the outbound wallet. For example, the restore transactions may involve multiple steps, which may take a relatively longer time than withdrawal transactions for security purposes.

Accordingly, techniques described herein may allow for the custodial token platform to determine a balance of each crypto token of a plurality of crypto tokens stored in the outbound wallets. That is, the custodial token platform may perform a simulation of withdrawal transactions from the outbound wallets (e.g., using historical withdrawal data). The custodial token platform may further perform a determination procedure (e.g., using data from the simulation) to determine a ratio between each crypto token of the plurality of crypto tokens stored in the outbound wallets that is associated with a relatively smaller withdrawal time than one or more other ratios. The determination procedure may therefore decrease (e.g., minimize) an average delay associated with a plurality of users withdrawing the crypto tokens while maintaining a total quantity of crypto tokens stored in the outbound wallets below a threshold.

Figure 1:
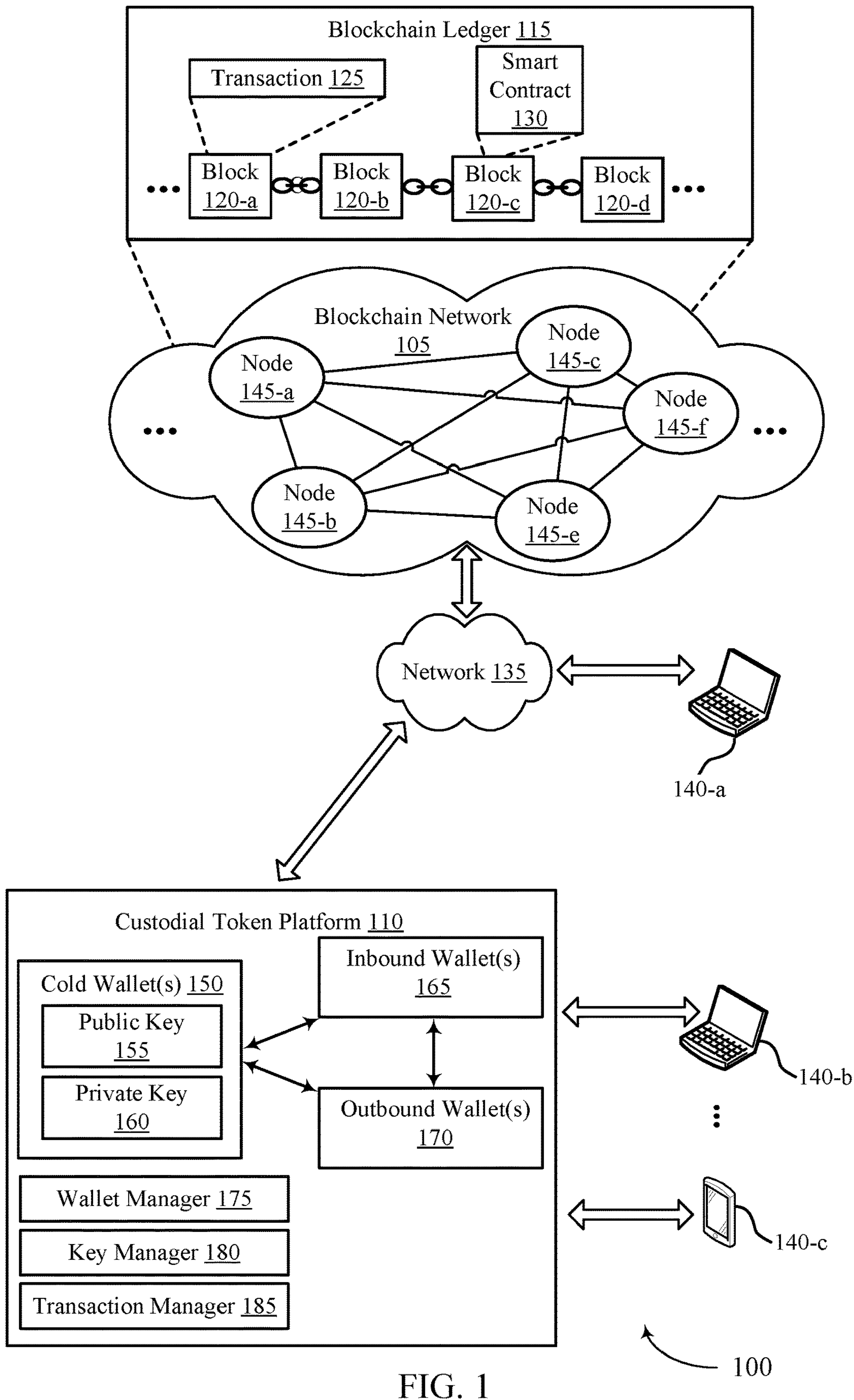
FIG. 1 illustrates an example of a computing environment that supports identification of token thresholds using message simulation in accordance with aspects of the present disclosure.

FIG. 1 illustrates an example of a computing environment 100 that supports identification of token thresholds using message simulation in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 (e.g., a node 145-*a*, a node 145-*b*, a node 145-*c*, a node 145-*d*, a node 145-*e*, and anode 145-*f*) of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity thresholds, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis. Additionally, the flush transactions may be provided such as to support liquidity of a crypto token and/or withdrawals of a crypto token. For example, if a user attempts to withdraw a crypto token from the user account associated with the custodial token platform 110, and there are not enough funds in the outbound wallet 170 to cover the withdrawal, then the transaction time for the withdrawal may be increased, as funds may be supplied to the outbound wallet 170 from an inbound wallets 165 or the cold wallet 150 via another transaction to support the withdrawal. Depending on the blockchain network 105 associated with token being withdrawn and/or the state of the blockchain network 105, these transactions may involve significant amounts of time. As such, a withdrawal may be delayed, which may result in unsatisfactory user experience. Additionally, the additional transactions may result in additional computing resource usage (e.g., memory and processor resources) as these additional resources may be required to generate, transmit, and/or verify these transactions (e.g., at a blockchain node 145).

Additionally, the custodial token platform 110 may maintain a balance in the cold wallet 150 for one or more crypto tokens for security reasons and business reasons. For example, the custodial token platform 110 may maintain a balance in a cold wallet 150 for insurance conditions, to support stable tokens, and to mitigate risk. However, in some cases, tokens may be moved from the cold wallets 150 to the outbound wallets 170 to support withdrawals and liquidity. However, maintaining a relatively large balance on an outbound wallet 170 may increase risk and exposure.

Techniques described herein support automatic and dynamic transactions to move crypto tokens between the outbound wallets 170 and the cold wallets 150. For example, the custodial token platform 110 may be configured to broadcast transactions to move crypto tokens between the outbound wallets 170 and the cold wallets 150 based on a configurable balance ratio between a plurality of crypto tokens. In some examples, the custodial token platform 110 may be configured to simulate withdrawal transactions of crypto tokens from the outbound wallets 170 based on various balance configurations or thresholds, and may determine (e.g., optimize) the balance ratio between the plurality of crypto tokens based on the simulations. The custodial token platform 110 may broadcast transactions that move crypto tokens between the outbound wallets 170 and the cold wallets 150 based on the selected threshold or balance ratio configuration.

It should be appreciated by a person skilled in the art that one or more aspects of the disclosure may be implemented in a computing environment 100 to additionally or alternatively solve other problems than those described herein. Further, aspects of the disclosure may provide technical improvements to "conventional" systems or processes as described herein. However, the description and appended drawings include example technical improvements resulting from implementing aspects of the disclosure, and accordingly do not represent all of the technical improvements provided within the scope of the claims.

Figure 2:
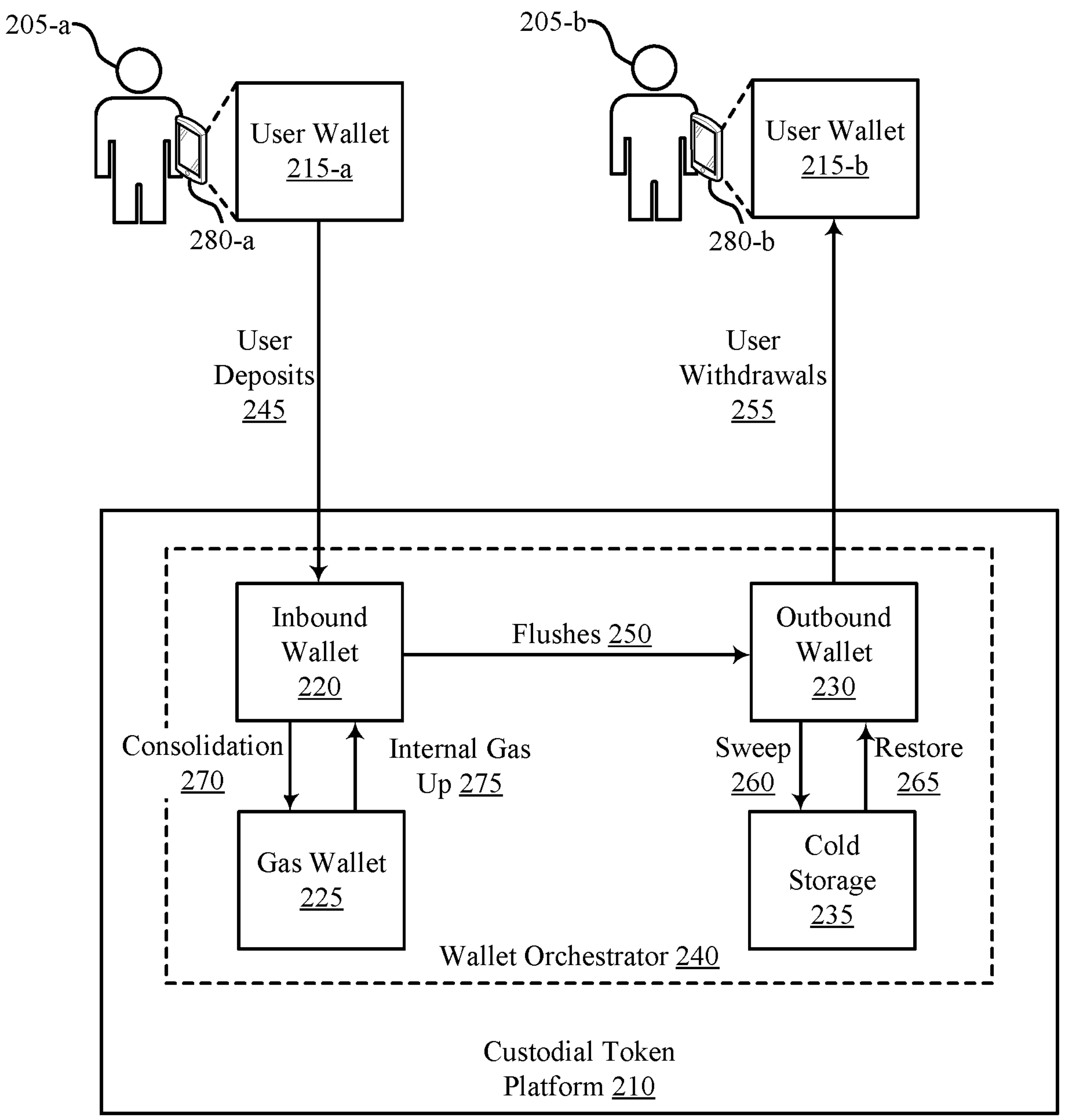
FIG. 2 shows an example of a computing environment that supports identification of token thresholds using message simulation in accordance with aspects of the present disclosure.

FIG. 2 shows an example of a computing environment 200 that supports identification of token thresholds using message simulation in accordance with aspects of the present disclosure. The computing environment 200 includes a custodial token platform 210 and users 205 with respective user devices 280. The custodial token platform 210 may be an example of the custodial token platform 110 as described with respect to FIG. 1, and the user devices 280 may be examples of the computing devices 140 as described with respect to FIG. 1.

The custodial token platform 210 may support various wallets for various purposes. For example, the custodial token platform 210 supports inbound wallets 220, gas wallets 225, outbound wallets 170, and cold storage 235 (e.g., cold storage wallets). In some examples, the custodial token platform 210 may create or implement a new inbound wallet per user, per user account, or per deposit transaction 245. For example, the user 205-*a* may access a user wallet 215-*a* on the user device 280-*a* to generate and broadcast a deposit transaction 245 to deposit a crypto token to an account associated with the custodial token platform 210. The account may be associated with user 205-*a* or another user. In some examples, for each deposit transaction 245, the custodial token platform generates a new inbound wallet 220. In other cases, the custodial token platform 210 may maintain an inbound wallet 220 per user account (or per crypto token per user account or per blockchain network used by a user account).

Additionally, as described herein, the custodial token platform may broadcast transactions (e.g., to the blockchain network 105 of FIG. 1) to move crypto tokens between the various wallets of the custodial token platform 110. For example, the custodial token platform 210 may implement periodic flush transactions 250 to move crypto tokens between inbound wallets 220 and the outbound wallets 230. In some examples, the flush transactions 250 are periodic and used to support user withdrawal transactions 255. For example, a user may access a user account on the custodial token platform 210 (e.g., via the user device 280-*b*) and withdraw funds (via a withdrawal transaction 255) to the external user wallet 215-*b* or send funds to another external user wallet associated with another user.

In some cases, the custodial token platform 210 may use the gas wallet 225 to consolidate crypto tokens (e.g., via a consolidation transaction 270) and to leverage for providing assets (e.g., crypto tokens) to cover transaction fees (e.g., via internal gas up transactions 275). For example, after determining to flush one of the inbound wallets 220, the custodial token platform may provide tokens to the inbound wallet 220 via the internal gas up transaction 275 and flush the inbound wallet 220 via the flush transaction 250. Any tokens remaining in the inbound wallet 220 after the flush may be provided to the gas wallet 225 via a consolidation transaction 270.

Additionally, a wallet orchestrator 240 of the custodial token platform 210 may broadcast sweep transactions 260 to move crypto tokens from the outbound wallets 230 to the cold storage 235 and restore transactions 265 to move crypto tokens from the cold storage 235 to the outbound wallet 230. For example, the wallet orchestrator 240 may perform the sweep transaction 260 when the balance of the outbound wallet 230 (e.g., a hot wallet) is greater than a maximum balance threshold. Further, the wallet orchestrator 240 may perform a restore transaction 265 when the balance of the outbound wallet 230 is less than a minimum balance threshold. The maximum and minimum balance may be configured to maintain liquidity at the hot wallet (e.g., to support withdrawal transactions 255) and security, by maintaining a low risk profile with funds in the cold storage 235.

In some cases, a withdrawal time associated with a withdrawal transaction 255 may depend on a balance of crypto tokens stored in the outbound wallet 230. That is, if the user 205-*b* performs a withdrawal transaction 255 to withdraw a total balance of tokens that is less than the balance stored in the outbound wallet 230, the withdrawal transaction 255 may be relatively short. However, if the user 205-*b* performs a withdrawal transaction 255 to withdraw a total balance of tokens that is greater than the balance stored in the outbound wallet 230, the wallet orchestrator 240 may broadcast a restore transaction 265 to move funds from the cold storage 235 to the outbound wallet 230 (e.g., such that the user 205-*b* may withdraw the tokens from the outbound wallet 230). Such withdrawal transactions 255 may take a relatively longer withdrawal time than the withdrawal transactions 255 to withdraw fewer tokens. That is, as cryptocurrency markets are dynamic, thresholds for maximum balances of outbound wallets 230 may result in increased risk and long withdrawal times for withdrawal transactions 255 due to not having enough funds in the outbound wallet 230 to support current withdrawals.

Techniques described herein support determining ratios between a plurality of crypto tokens stored in the outbound wallet 230 to reduce an average withdrawal time of withdrawal transactions 255. For example, the custodial token platform 210 may determine one or more thresholds of a balance for each token of a plurality of crypto tokens stored in the outbound wallets 230. Such thresholds may determine a timing of sweep transactions 260 and restore transactions 265 between the outbound wallets 230 and the cold storage 235 to prevent a total balance of the outbound wallets 230 from exceeding a predetermined risk threshold while maintaining adequate funds to support withdrawal transactions 255 from the outbound wallets 230 (e.g., without increasing an average withdrawal time).

In some examples, such thresholds may be determined manually (e.g., by an operator of the custodial token platform 210). However, such manual determination may be associated with relatively higher time and monetary costs than automated threshold determination. Accordingly, the custodial token platform 210 may utilize a wallet orchestrator 240 simulator to facilitate systematic use of data for backtesting and automated threshold determination (e.g., optimization).

Techniques described herein address the foregoing by providing outbound wallet 230 balance thresholds for each of a plurality of crypto tokens that may be based on historical transaction data. These thresholds may change based on how new each crypto token is (e.g., in terms of when the custodial token platform 210 added support for each crypto token), trading volume, withdrawal volume, etc. To support these thresholds, the wallet orchestrator 240 may implement a simulator that uses historical transaction data for each of the plurality of crypto tokens to model the use of different balance thresholds and resulting duration of withdrawal transactions 255 (e.g., send requests) that are waiting for liquidity at the outbound wallet 230. The model may select balance thresholds for each token that result in a reduced quantity of restore transactions 265 while limiting or reducing the quantity of send requests that are waiting for liquidity. As such, the balance thresholds may be selected such as to reduce withdrawal times, which may result in reduced resource overhead and improved user experience.

Figure 3:
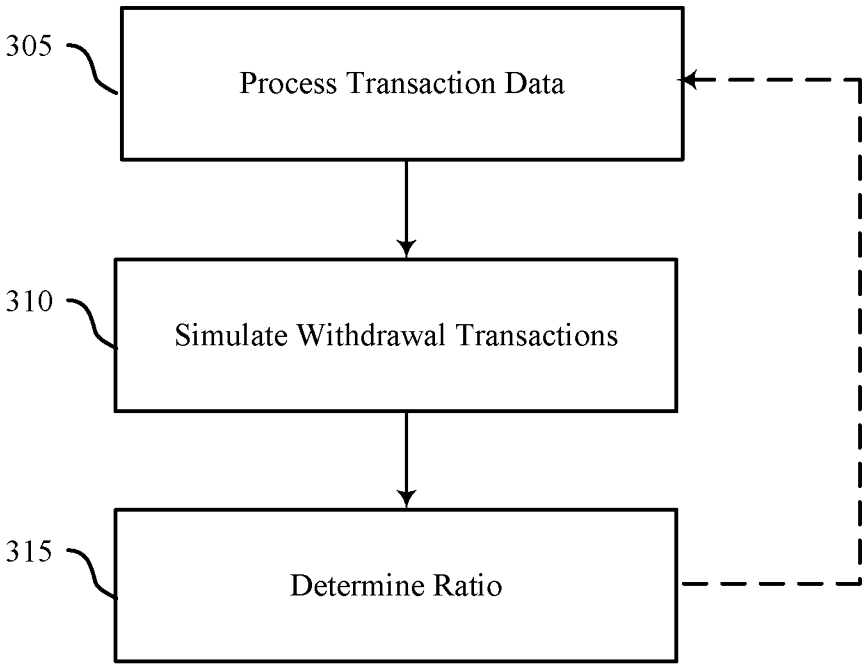
FIG. 3 shows an example of a block diagram that supports identification of token thresholds using message simulation in accordance with aspects of the present disclosure.

FIG. 3 shows an example of a block diagram 300 that supports identification of token thresholds using message simulation in accordance with aspects of the present disclosure. In some examples, the block diagram 300 may implement or may be implemented by aspects of the computing environment 100 and the computing environment 200. For example, the block diagram 300 may be implemented by a custodial token platform which may be an example of a custodial token platform 110 as described with reference to FIG. 1.

At 305, a custodial token platform may process a corpus of transaction data (e.g., message data). For example, the custodial token platform may process data related to transactions (e.g., deposit, withdrawal, sweep, or restore messages) of a plurality of crypto tokens performed by the custodial token platform between a plurality of outbound wallets and cold storage wallets as described with reference to FIG. 2. The transaction data may additionally or alternatively include historic price data of the plurality of crypto tokens. In some examples, the transaction data may include data from a lookback window (e.g., from a quantity of preceding weeks or months). In some examples, the transaction data may include data from a specified time of year (e.g., historical transaction data related to a current time of year from one or more previous years).

At 310, a wallet orchestrator of the custodial token platform may perform a simulation of withdrawal transactions (e.g., withdrawal messages) using the corpus of transaction data. For example, the wallet orchestrator may have a simulator component that may serve as a model approximation of an operational business logic employed by the wallet orchestrator. The simulator component may accept one or more orchestration configurations (e.g., arbitrary orchestration configurations). The orchestration configurations may include balance limits or thresholds (e.g., minimum and maximum balances) for the plurality of crypto tokens and structured deposit and withdrawal data (e.g., from the corpus of transaction data).

Such inputs may enable the simulator to simulate wallet orchestrator operations based on the configuration parameters. For example, the simulator may replicate orchestration of sweep transactions, restore transactions, and customer withdrawal transactions using various configuration parameters. Accordingly, the simulator may provide the custodial token platform with performance metrics (e.g., a quantity of restore transactions, total or average waiting times associated with withdrawal transactions, instances of blocked withdrawals) which the custodial token platform may use to evaluate an effectiveness of the orchestration configurations.

In some examples, the simulator may be a simplified emulation of an orchestration logic program within the wallet orchestrator service. The wallet orchestrator may implement the simulator using a computer program (e.g., a Python program integrated into an Airflow environment). In some examples, a code (e.g., a processor-executable code) of the computer program may be executed using one or more code libraries (e.g., Python libraries such as pandas, numpy, and multiprocessing). To increase an efficiency associated with running the simulation, the code may incorporate multiprocessing logic, which may allow the simulator to concurrently handle various configurations and crypto tokens (e.g., within the Airflow environment).

At 315, the wallet orchestrator of the custodial token platform may perform a determination procedure (e.g., an optimization) to select one or more of the one or more orchestration configurations. For example, the wallet orchestrator may evaluate orchestration configurations and corresponding performance metrics provided by the simulator. The wallet orchestrator may identify a combination of configurations (e.g., a valid combination of token balance thresholds) that reduces (e.g., minimizes) a specified cost function. In some examples, the cost function may be associated with the duration of withdrawal transactions. That is, the identified combination of configurations may be associated with a relatively lower withdrawal time than some other combinations of configurations.

For example, the wallet orchestrator may determine a configuration (e.g., a minimum and maximum token balance threshold) for each of the plurality of crypto tokens. The selected configuration may maintain a total balance (e.g., cumulative limit) for all of the plurality of crypto tokens below a threshold (e.g., a predefined risk threshold). The selected configuration may further reduce (e.g., minimize) a total or average waiting time associated with customer withdrawals (e.g., due to low liquidity).

In some examples, the wallet orchestrator may use discretization of continuous configuration parameters. That is, the wallet orchestrator may map each configuration parameter to a discrete value to perform the determination. The discretization may allow the wallet orchestrator to solve a relatively simpler calculation (e.g., as compared to a complex nonlinear optimization problem, which may be associated with a lengthy convergence time). That is, the discretization may allow the wallet orchestrator to solve a knapsack problem (e.g., a tractable 0-1 knapsack problem) to select the configurations. The wallet orchestrator may solve the knapsack problem using a processor-executable code (e.g., a Python code using a cvxpy package).

In some examples, the custodial token platform may retrain the simulator (e.g., periodically). That is, the custodial token platform may process a second corpus of transaction data (e.g., from a different time period or with different price data than the first corpus of transaction data) and may perform the simulation and determination process using the second corpus of transaction data. In some examples, the custodial token platform may retrain the simulator and determine new configurations based on performing an anomaly detection procedure. That is, the custodial token platform may detect an anomaly associated with the first corpus of transaction data, and may retrain the simulator based on the second corpus of transaction data to omit the anomaly. Example anomalies may include a statistically significant increase or decrease of deposit and/or withdrawal transactions for one or more crypto tokens.

Figure 4:
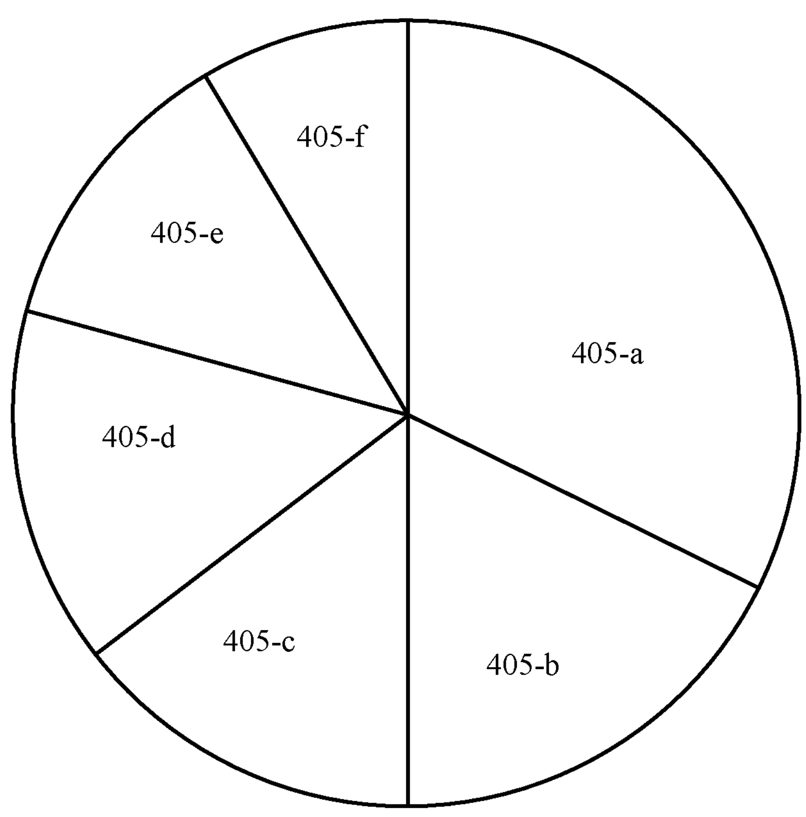
FIG. 4 shows an example of a graph that supports identification of token thresholds using message simulation in accordance with aspects of the present disclosure.

FIG. 4 shows an example of a graph 400 that supports identification of token thresholds using message simulation in accordance with aspects of the present disclosure. The graph 400 may implement or may be implemented by aspects of the computing environment 100, the computing environment 200, and the block diagram 300. For example, the graph 400 may be implemented by a custodial token platform which may be an example of a custodial token platform 110 as described with reference to FIG. 1.

In some examples, a custodial token platform may perform a simulation and configuration determination procedure as described with reference to FIG. 3. The custodial token platform may accordingly determine threshold balances (e.g., ratios) associated with a plurality of crypto tokens 405 (e.g., a crypto token 405-*a*, a crypto token 405-*b*, a crypto token 405-*c*, a crypto token 405-*d*, a crypto token 405-*e*, and a crypto token 405-*f*). to be stored in one or more outbound wallets. For example, as illustrated with reference to FIG. 4, the custodial token platform may determine a threshold total balance (e.g., a maximum balance) for one or more outbound wallets. The threshold total balance may be based on a cost associated with storing the plurality of crypto tokens 405 in the outbound wallet (e.g., as opposed to a cold storage wallet), insurance requirements, regulatory requirements, or the like The custodial token platform may determine a respective percentage of the total balance to be used for each of the plurality of crypto tokens 405. In some aspects, a crypto token 405-*a* associated with historically more or larger withdrawal transactions (e.g., withdrawal messages) may be associated with a larger percentage of the total balance than a crypto token 405-*f* associated with historically fewer or smaller withdrawal transactions. Each of the respective percentages to be used for each of the plurality of crypto tokens 405 may be determined by a wallet orchestrator via a simulation and optimization process as described with reference to FIG. 3. The combination of respective percentages for each of the plurality of crypto tokens 405 may be associated with a relatively smaller average withdrawal time than some other combinations of respective percentages.

Figure 5:
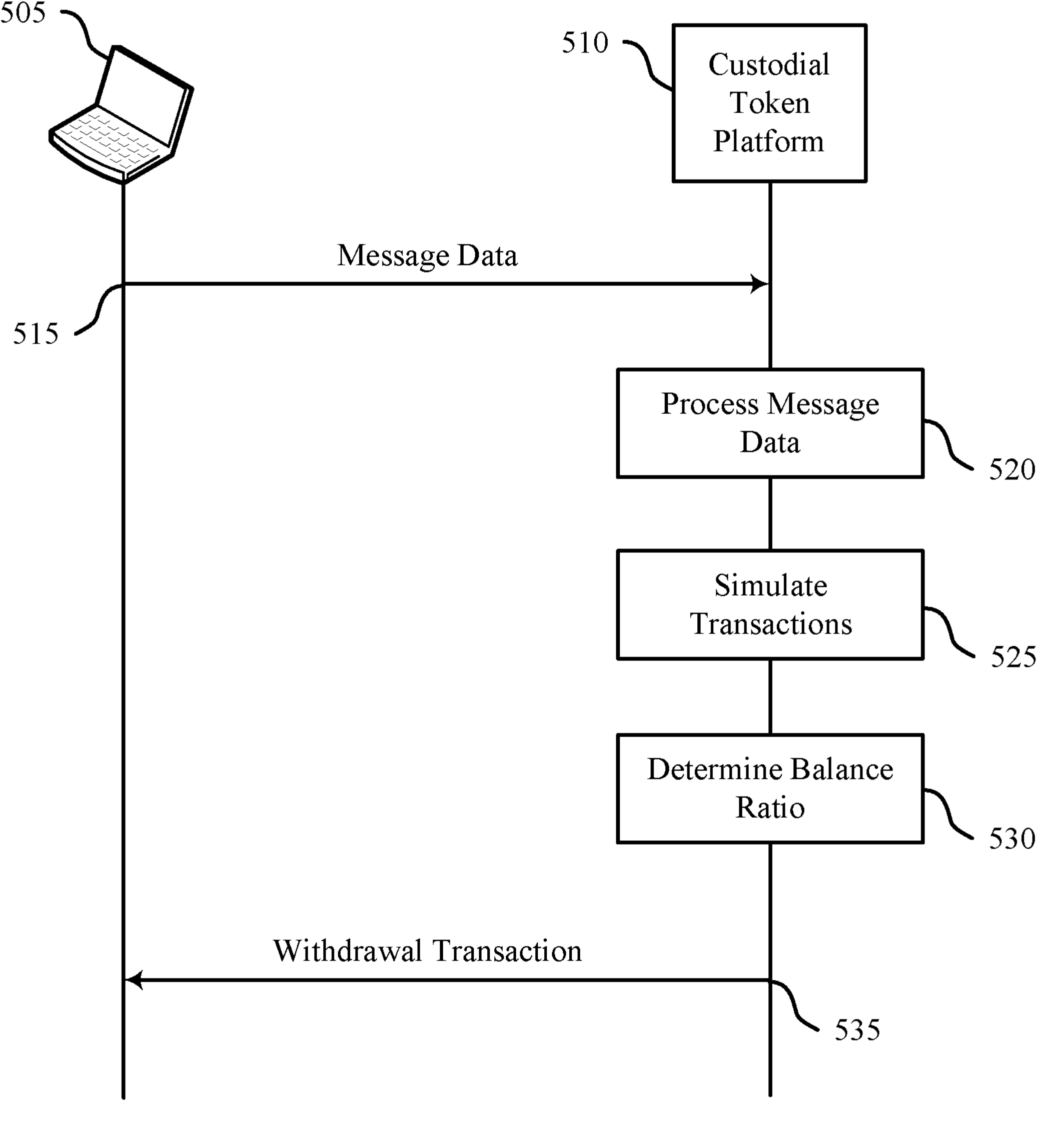
FIG. 5 shows an example of a process flow that supports identification of token thresholds using message simulation in accordance with aspects of the present disclosure.
Figure 5:

FIG. 5 shows an example of a process flow 500 that supports identification of token thresholds using message simulation in accordance with aspects of the present disclosure. The process flow 500 may implement or may be implemented by aspects of the computing environment 100, the computing environment 200, the block diagram 300, and the graph 400. For example, the process flow 500 may include a user device 505 and a custodial token platform 510, which may be examples of the corresponding devices described herein with reference to FIG. 1.

In the following description of the process flow 500, the operations between the user device 505 and the custodial token platform 510 may be transmitted in a different order than the example order shown, or the operations performed may be performed in different orders, at different times, or at the same time. Some operations may also be omitted from the process flow 500, and other operations may be added to the process flow 500.

At 515, the custodial token platform 510 may receive a corpus of message data associated with a custodial token platform from one or more user devices 505. The corpus of message data may indicate movements of a plurality of crypto tokens between outbound addresses of the custodial token platform and cold addresses managed by the custodial token platform. The corpus of message data may include withdrawal messages of a plurality of crypto tokens from one or more outbound addresses of the custodial token platform. The corpus of message data may include transaction timestamps and transaction amounts for one or more deposit or withdrawal transactions, token price data, and the crypto token that is transacted over a duration for each of the plurality of crypto tokens.

At 520, the custodial token platform 510 may process the corpus of message data. For example, processing the corpus of message data may include extracting such information from the corpus (e.g., extracting the information from the blockchain) and formatting the information to be ingested by a wallet orchestration simulation procedure.

At 525, the custodial token platform 510 may simulate a subset of the withdrawal messages of the plurality of crypto tokens from the one or more outbound addresses. For example, the custodial token platform 510 may simulate the subset using a portion of the message data from a defined window of time (e.g., from a lookback window or associated with a particular time of year).

At 530, the custodial token platform 510 may determine a target ratio between balances of each of the plurality of crypto tokens stored in the one or more outbound addresses. For example, the custodial token platform 510 may determine the target ratio via the simulation of the subset of the withdrawal messages. The target ratio may be based on a maximum balance of total crypto tokens to be stored in the one or more outbound addresses and an average withdrawal time associated with withdrawal of crypto tokens from the one or more outbound addresses. For example, the determination may be based on the target ratio being associated with a lower average withdrawal time than one or more other ratios between balances (e.g., maximum balances) of each of the plurality of crypto tokens stored in the one or more outbound addresses.

In some examples, the custodial token platform 510 may repeat the transaction simulation and balance ratio determination process (e.g., periodically or after performing an anomaly detection procedure). For example, the custodial token platform 510 may simulate a second subset of the withdrawal messages from the corpus of message data (e.g., after a defined time interval after simulating using the first subset). The custodial token platform 510 may determine, via the simulation of the second subset, an updated target ratio between balances of each of the plurality of crypto tokens (e.g., based on the maximum balance and a second average withdrawal time).

In some examples, the anomaly detection procedure may include identifying an anomaly associated with a first crypto token of the plurality of crypto tokens. For example, the anomaly may include a high rate of withdrawals or deposits of the first crypto token relative to a quantity of withdrawals or deposits of one or more other crypto tokens of the plurality of crypto tokens. In some examples, the anomaly detection procedure may include performing a comparison between simulated withdrawal results (e.g., a simulated balance in each of the one or more outbound addresses as a time series, a quantity of restore transactions) and historical withdrawal results (e.g., from the corpus of message data). For example, the anomaly may include a difference between the simulated withdrawal results and the historical withdrawal results. In some examples, the anomaly may include a difference between the first target ratio and the second target ratio. In some examples, one or both of the first target ratio and the second target ratio may be determined based on the anomaly. For example, the custodial token platform may determine to update the first target ratio and/or the second target ratio based on detecting the anomaly.

At 535, the user device 505 may perform a withdrawal transaction of one or more of the plurality of crypto tokens. In some examples, a withdrawal time associated with the withdrawal transaction may be smaller than a withdrawal time associated with a withdrawal transaction performed from an outbound wallet with a different ratio of crypto token balances (e.g., different from the target ratio).

Figure 6:
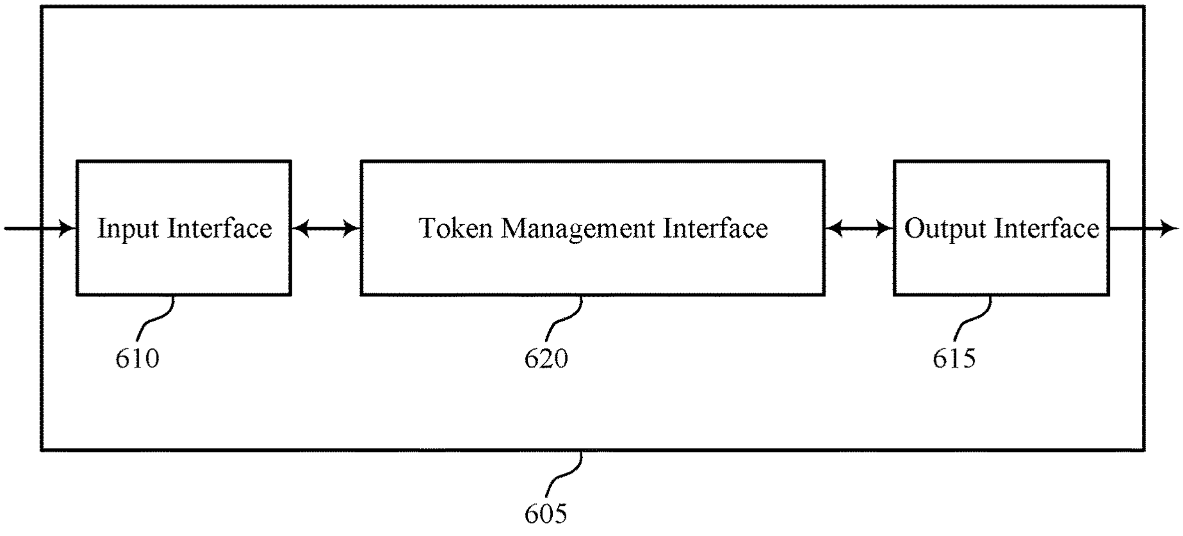
FIGS. 6 and 7 show block diagrams of devices that support identification of token thresholds using message simulation in accordance with aspects of the present disclosure.
Figure 6:

FIG. 6 shows a block diagram 600 of a device 605 that supports identification of token thresholds using message simulation in accordance with aspects of the present disclosure. The device 605 may be an example of aspects of a custodial token platform as described herein. The device 605 may include an input interface 610, an output interface 615, and a token management interface 620. The device 605, or one or more components of the device 605 (e.g., the input interface 610, the output interface 615, and the token management interface 620), may include at least one processor, which may be coupled with at least one memory, to, individually or collectively, support or enable the described techniques. Each of these components may communicate, directly or indirectly, with one another (e.g., via one or more buses, communications links, communications interfaces, or any combination thereof).

The input interface 610 may manage input signaling for the device 605. For example, the input interface 610 may receive input signaling (e.g., messages, packets, data, instructions, commands, transactions, or any other form of encoded information) from other systems or devices. The input interface 610 may send signaling corresponding to (e.g., representative of or otherwise based on) such input signaling to other components of the device 605 for processing. For example, the input interface 610 may transmit such corresponding signaling to the token management interface 620 to support identification of token thresholds using message simulation. In some cases, the input interface 610 may be a component of a network interface 925 as described with reference to FIG. 9.

The output interface 615 may manage output signaling for the device 605. For example, the output interface 615 may receive signaling from other components of the device 605, such as the token management interface 620, and may transmit such output signaling corresponding to (e.g., representative of or otherwise based on) such signaling to other systems or devices. In some cases, the output interface 615 may be a component of a network interface 925 as described with reference to FIG. 9.

The token management interface 620, the input interface 610, the output interface 615, or various combinations thereof or various components thereof may be examples of means for performing various aspects of identification of token thresholds using message simulation as described herein. For example, the token management interface 620, the input interface 610, the output interface 615, or various combinations or components thereof may be capable of performing one or more of the functions described herein.

In some examples, the token management interface 620, the input interface 610, the output interface 615, or various combinations or components thereof may be implemented in hardware (e.g., in communications management circuitry). The hardware may include at least one of a processor, a DSP, an ASIC, an FPGA or other programmable logic device, a discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the token management interface 620, the input interface 610, the output interface 615, or various combinations or components thereof may be implemented in code (e.g., as communications management software or firmware) executed by at least one processor. If implemented in code executed by at least one processor, the functions of the token management interface 620, the input interface 610, the output interface 615, or various combinations or components thereof may be performed by a general-purpose processor, a DSP, a CPU, an ASIC, an FPGA, or any combination of these or other programmable logic devices (e.g., configured as or otherwise supporting, individually or collectively, a means for performing the functions described in the present disclosure).

In some examples, the token management interface 620 may be configured to perform various operations (e.g., receiving, monitoring, transmitting) using or otherwise in cooperation with the input interface 610, the output interface 615, or both. For example, the token management interface 620 may receive information from the input interface 610, send information to the output interface 615, or be integrated in combination with the input interface 610, the output interface 615, or both to receive information, transmit information, or perform various other operations as described herein.

The token management interface 620 may support digital token management in accordance with examples as disclosed herein. For example, the token management interface 620 may be configured as or otherwise support a means for processing a corpus of message data associated with a custodial token platform, the corpus of message data indicating withdrawal messages of a plurality of crypto tokens from one or more outbound addresses of the custodial token platform. The token management interface 620 may be configured as or otherwise support a means for simulating, using the corpus of message data, a subset of the withdrawal messages of the plurality of crypto tokens from the one or more outbound addresses. The token management interface 620 may be configured as or otherwise support a means for determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses.

By including or configuring the token management interface 620 in accordance with examples as described herein, the device 605 (e.g., at least one processor controlling or otherwise coupled with the input interface 610, the output interface 615, the token management interface 620, or a combination thereof) may support techniques for identifying crypto token thresholds using message simulation, which may allow for increased efficiency of wallet orchestration and reduced latency.

Figure 7:
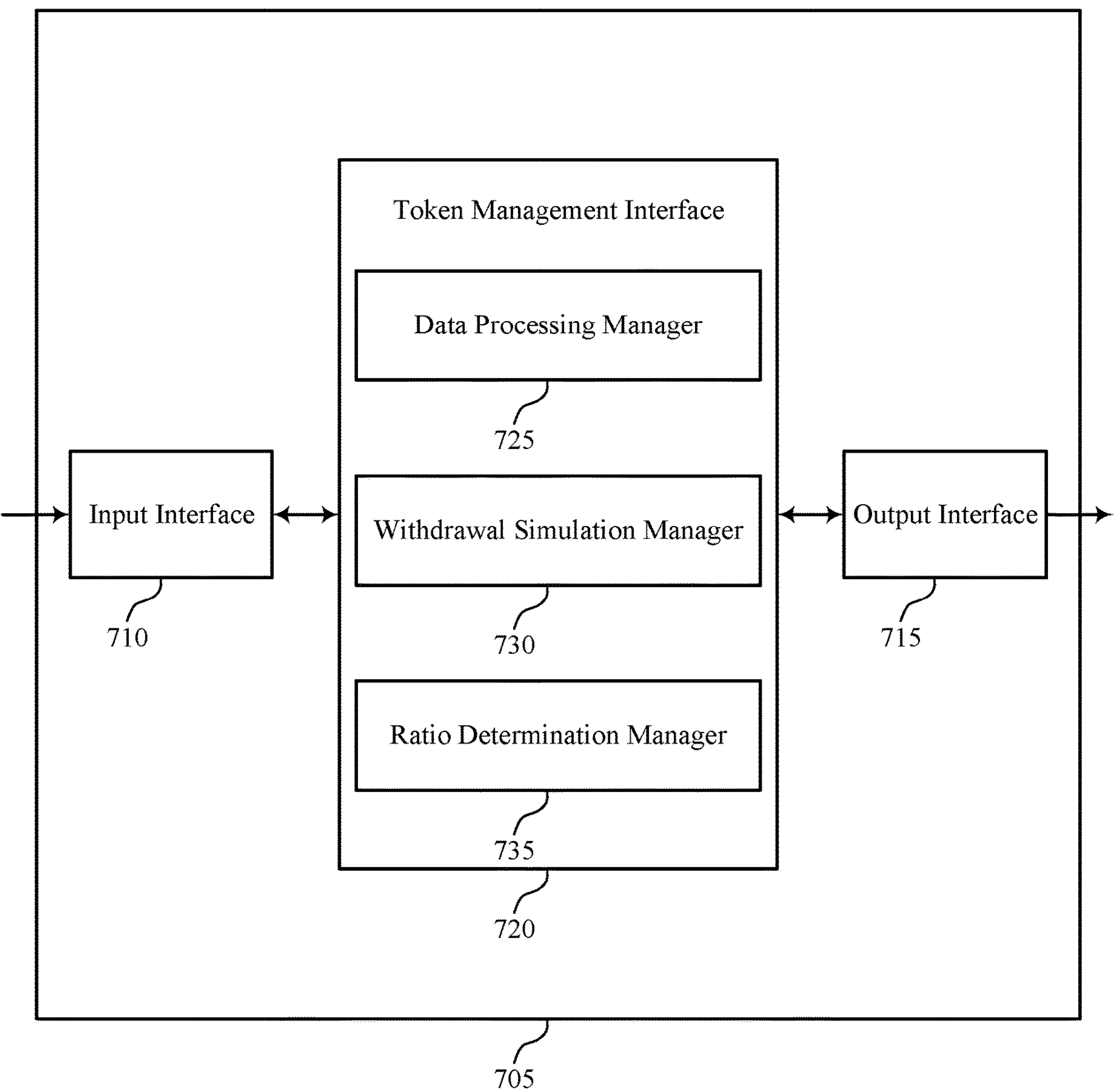

FIG. 7 shows a block diagram 700 of a device 705 that supports identification of token thresholds using message simulation in accordance with aspects of the present disclosure. The device 705 may be an example of aspects of a device 605 or a custodial token platform 110 as described herein. The device 705 may include an input interface 710, an output interface 715, and a token management interface 720. The device 705, or one or more components of the device 705 (e.g., the input interface 710, the output interface 715, and the token management interface 720), may include at least one processor, which may be coupled with at least one memory, to support the described techniques. Each of these components may communicate, directly or indirectly, with one another (e.g., via one or more buses, communications links, communications interfaces, or any combination thereof).

The input interface 710 may manage input signaling for the device 705. For example, the input interface 710 may receive input signaling (e.g., messages, packets, data, instructions, commands, transactions, or any other form of encoded information) from other systems or devices. The input interface 710 may send signaling corresponding to (e.g., representative of or otherwise based on) such input signaling to other components of the device 705 for processing. For example, the input interface 710 may transmit such corresponding signaling to the token management interface 720 to support identification of token thresholds using message simulation. In some cases, the input interface 710 may be a component of a network interface 925 as described with reference to FIG. 9.

The output interface 715 may manage output signaling for the device 705. For example, the output interface 715 may receive signaling from other components of the device 705, such as the token management interface 720, and may transmit such output signaling corresponding to (e.g., representative of or otherwise based on) such signaling to other systems or devices. In some cases, the output interface 715 may be a component of a network interface 925 as described with reference to FIG. 9.

The device 705, or various components thereof, may be an example of means for performing various aspects of identification of token thresholds using message simulation as described herein. For example, the token management interface 720 may include a data processing manager 725, a withdrawal simulation manager 730, a ratio determination manager 735, or any combination thereof. The token management interface 720 may be an example of aspects of a token management interface 620 as described herein. In some examples, the token management interface 720, or various components thereof, may be configured to perform various operations (e.g., receiving, monitoring, transmitting) using or otherwise in cooperation with the input interface 710, the output interface 715, or both. For example, the token management interface 720 may receive information from the input interface 710, send information to the output interface 715, or be integrated in combination with the input interface 710, the output interface 715, or both to receive information, transmit information, or perform various other operations as described herein.

The token management interface 720 may support digital token management in accordance with examples as disclosed herein. The data processing manager 725 may be configured as or otherwise support a means for processing a corpus of message data associated with a custodial token platform, the corpus of message data indicating withdrawal messages of a plurality of crypto tokens from one or more outbound addresses of the custodial token platform. The withdrawal simulation manager 730 may be configured as or otherwise support a means for simulating, using the corpus of message data, a subset of the withdrawal messages of the plurality of crypto tokens from the one or more outbound addresses. The ratio determination manager 735 may be configured as or otherwise support a means for determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses.

Figure 8:
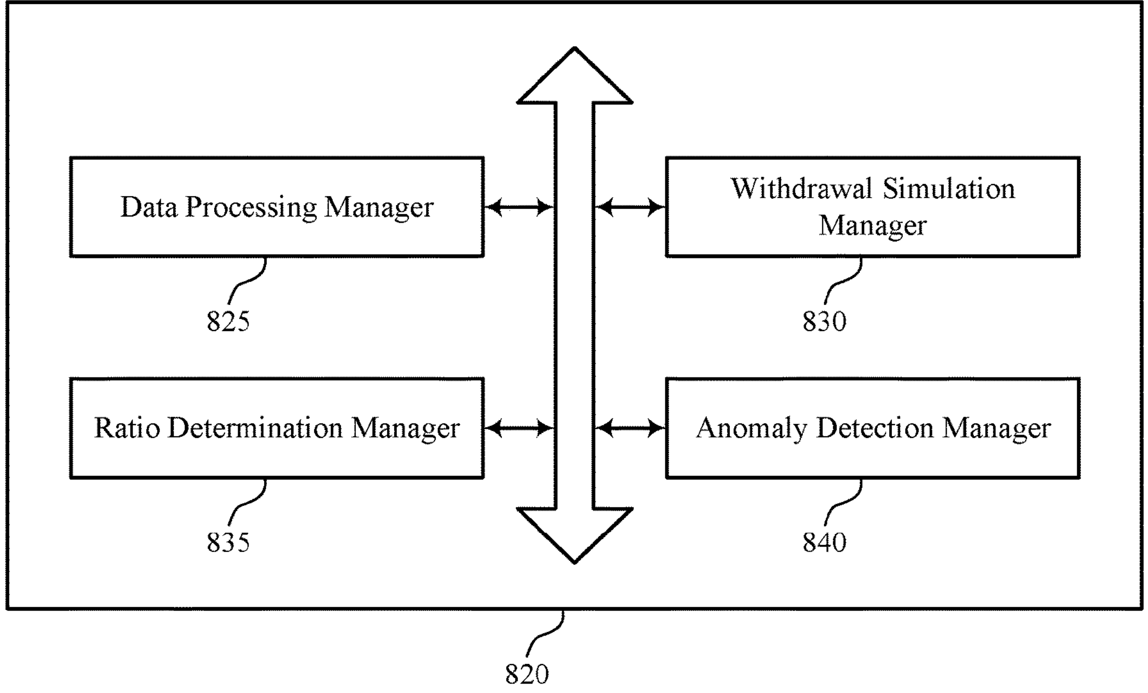
FIG. 8 shows a block diagram of a token management interface that supports identification of token thresholds using message simulation in accordance with aspects of the present disclosure.
Figure 8:

FIG. 8 shows a block diagram 800 of a token management interface 820 that supports identification of token thresholds using message simulation in accordance with aspects of the present disclosure. The token management interface 820 may be an example of aspects of a token management interface 620, a token management interface 720, or both, as described herein. The token management interface 820, or various components thereof, may be an example of means for performing various aspects of identification of token thresholds using message simulation as described herein. For example, the token management interface 820 may include a data processing manager 825, a withdrawal simulation manager 830, a ratio determination manager 835, an anomaly detection manager 840, or any combination thereof. Each of these components may communicate, directly or indirectly, with one another (e.g., via one or more buses, communications links, communications interfaces, or any combination thereof).

The token management interface 820 may support digital token management in accordance with examples as disclosed herein. The data processing manager 825 may be configured as or otherwise support a means for processing a corpus of message data associated with a custodial token platform, the corpus of message data indicating withdrawal messages of a plurality of crypto tokens from one or more outbound addresses of the custodial token platform. The withdrawal simulation manager 830 may be configured as or otherwise support a means for simulating, using the corpus of message data, a subset of the withdrawal messages of the plurality of crypto tokens from the one or more outbound addresses. The ratio determination manager 835 may be configured as or otherwise support a means for determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses.

In some examples, the determining is based at least in part on the target ratio being associated with a lower average withdrawal time than one or more other ratios between balances of each of the plurality of crypto tokens stored in the one or more outbound addresses.

In some examples, the message data comprises deposit data, withdrawal data, and price data for each crypto token of the plurality of crypto tokens.

In some examples, to support simulating the subset of the withdrawal messages, the withdrawal simulation manager 830 may be configured as or otherwise support a means for simulating the subset using a portion of the message data from a defined window of time.

In some examples, the defined window of time is associated with a particular time of year.

In some examples, the withdrawal simulation manager 830 may be configured as or otherwise support a means for simulating, after a defined interval after simulating using the subset, a second subset of the withdrawal messages from the corpus of message data. In some examples, the ratio determination manager 835 may be configured as or otherwise support a means for determining, via the simulation of the second subset, an updated target ratio between balances of each of the plurality of crypto tokens based at least in part on the maximum balance and the average withdrawal time.

In some examples, the target ratio is updated periodically.

In some examples, the anomaly detection manager 840 may be configured as or otherwise support a means for identifying, based at least in part on simulating the subset, an anomaly associated with a first crypto token of the plurality of crypto tokens, wherein the target ratio is determined using the anomaly.

In some examples, anomaly comprises a high rate of withdrawals or deposits associated with the first crypto token relative to a rate of withdrawals or deposits for one or more second crypto tokens or one or more prior windows of time.

Figure 9:
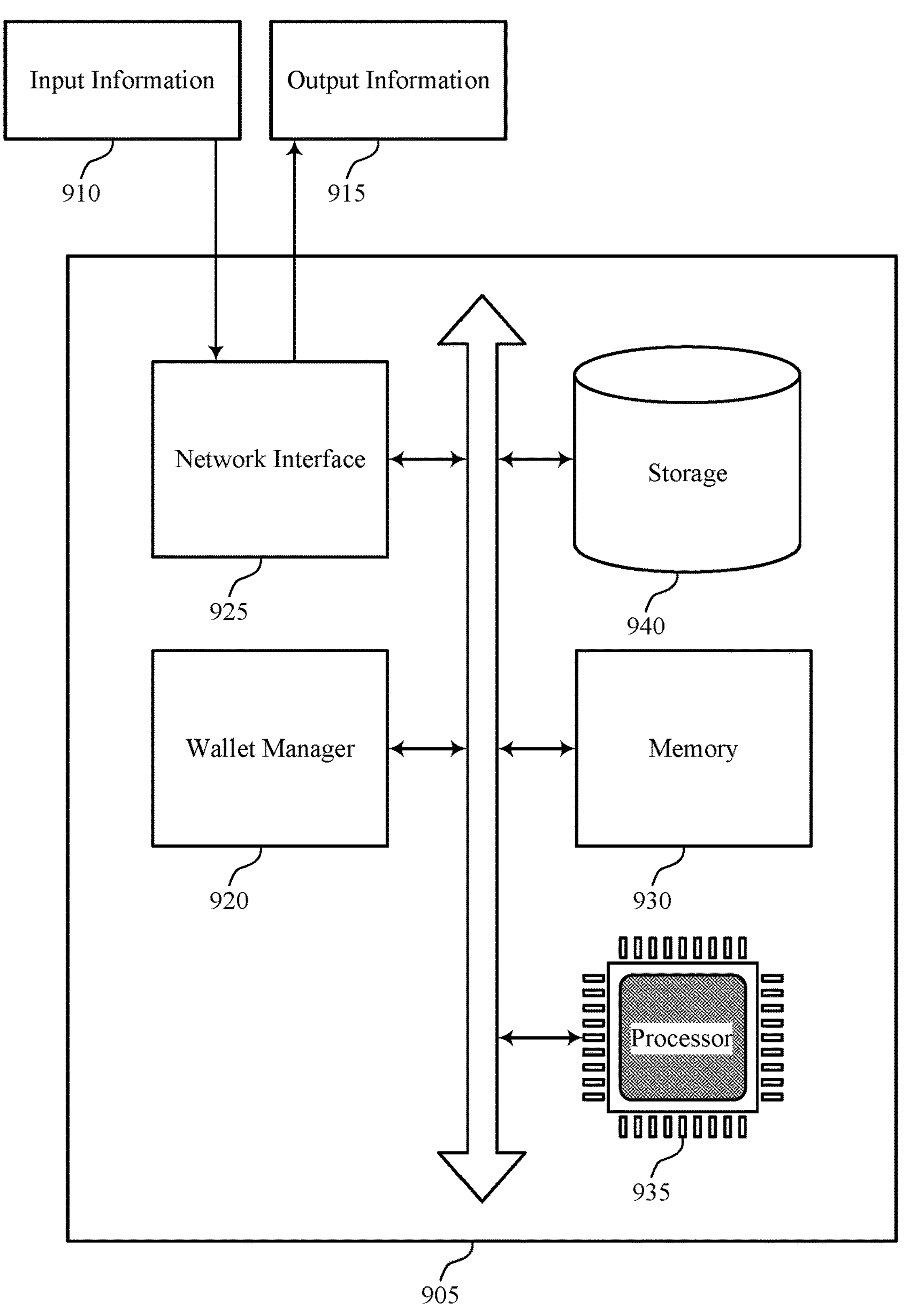
FIG. 9 shows a diagram of a system including a device that supports identification of token thresholds using message simulation in accordance with aspects of the present disclosure.

FIG. 9 shows a diagram of a system 900 including a device 905 that supports identification of token thresholds using message simulation in accordance with aspects of the present disclosure. The device 905 may be an example of or include the components of a device 605, a device 705, or a custodial token platform as described herein. The device 905 may include components for communications, blockchain transactions, user interfacing, and cryptographic operations, such as a wallet manager 920, an input information 910, an output information 915, a network interface 925, at least one memory 930, at least one processor 935, and a storage 940. These components may be in electronic communication or otherwise coupled (e.g., operatively, communicatively, functionally, electronically, electrically) via one or more buses.

The network interface 925 may enable the device 905 to exchange information (e.g., input information 910, output information 915, or both) with other systems or devices (not shown). For example, the network interface 925 may enable the device 905 to connect to a network (e.g., a network 135 as described herein). The network interface 925 may include one or more wireless network interfaces, one or more wired network interfaces, or any combination thereof.

Memory 930 may include RAM, ROM, or both. The memory 930 may store computer-readable, computer-executable software including instructions that, when executed, cause at least one processor 935 to perform various functions described herein, such as functions supporting identification of token thresholds using message simulation. In some cases, the memory 930 may contain, among other things, a basic input/output system (BIOS), which may control basic hardware or software operation such as the interaction with peripheral components or devices. In some cases, the memory 930 may be an example of aspects of one or more components of a custodial token platform 110 as described with reference to FIG. 1. The memory 930 may be an example of a single memory or multiple memories. For example, the device 905 may include one or more memories 930.

The processor 935 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 935 may be configured to execute computer-readable instructions stored in at least one memory 930 to perform various functions (e.g., functions or tasks supporting identification of token thresholds using message simulation). Though a single processor 935 is depicted in the example of FIG. 9, it is to be understood that the device 905 may include any quantity of one or more of processors 935 and that a group of processors 935 may collectively perform one or more functions ascribed herein to a processor, such as the processor 935. The processor 935 may be an example of a single processor or multiple processors. For example, the device 905 may include one or more processors 935.

Storage 940 may be configured to store data that is generated, processed, stored, or otherwise used by the device 905. In some cases, the storage 940 may include one or more HDDs, one or more SDDs, or both. In some examples, the storage 940 may be an example of a single database, a distributed database, multiple distributed databases, a data store, a data lake, or an emergency backup database. In some examples, the storage 940 may be an example of one or more components described with reference to FIG. 1.

The wallet manager 920 may support digital token management in accordance with examples as disclosed herein. For example, the wallet manager 920 may be configured as or otherwise support a means for processing a corpus of message data associated with a custodial token platform, the corpus of message data indicating withdrawal messages of a plurality of crypto tokens from one or more outbound addresses of the custodial token platform. The wallet manager 920 may be configured as or otherwise support a means for simulating, using the corpus of message data, a subset of the withdrawal messages of the plurality of crypto tokens from the one or more outbound addresses. The wallet manager 920 may be configured as or otherwise support a means for determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses.

By including or configuring the wallet manager 920 in accordance with examples as described herein, the device 905 may support techniques for identifying crypto token thresholds using message simulation, which may allow for reduced latency, improved user experience related to reduced transaction time, and reduced risk costs.

Figure 10:
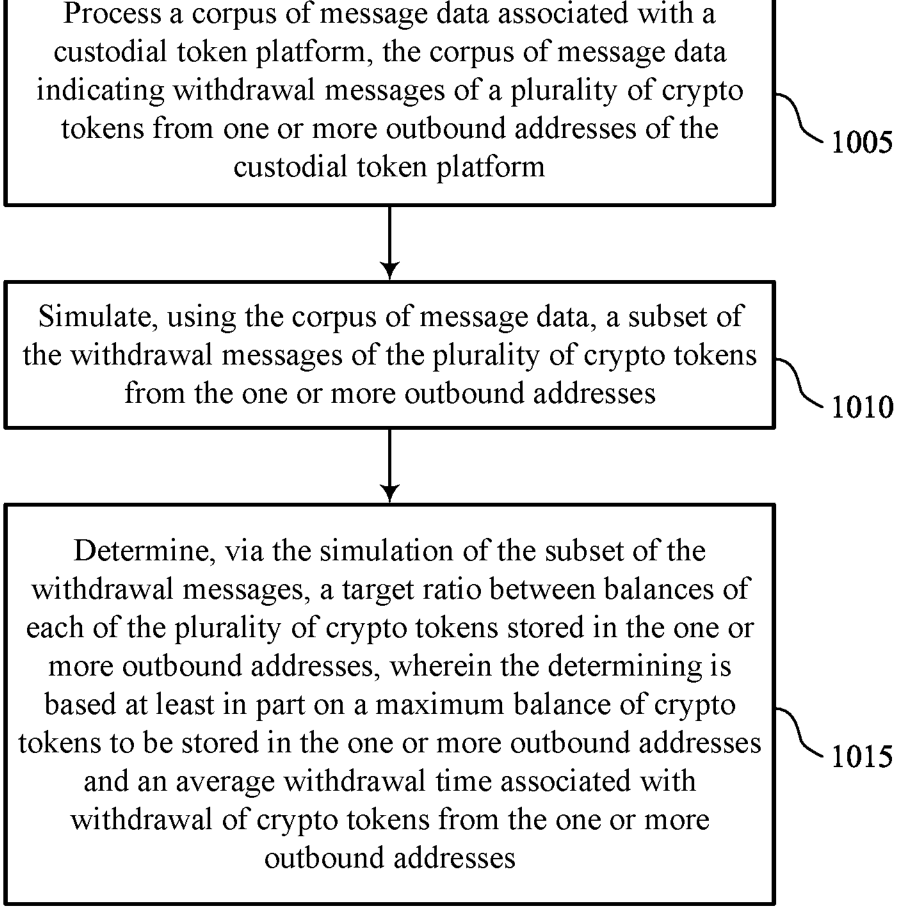
FIGS. 10 through 12 show flowcharts illustrating methods that support identification of token thresholds using message simulation in accordance with aspects of the present disclosure.

FIG. 10 shows a flowchart illustrating a method 1000 that supports identification of token thresholds using message simulation in accordance with aspects of the present disclosure. The operations of the method 1000 may be implemented by a custodial token platform or its components as described herein. For example, the operations of the method 1000 may be performed by a custodial token platform as described with reference to FIGS. 1 through 9. In some examples, a custodial token platform may execute a set of instructions to control the functional elements of the custodial token platform to perform the described functions. Additionally, or alternatively, the custodial token platform may perform aspects of the described functions using special-purpose hardware.

At 1005, the method may include processing a corpus of message data associated with a custodial token platform, the corpus of message data indicating withdrawal messages of a plurality of crypto tokens from one or more outbound addresses of the custodial token platform. The operations of 1005 may be performed in accordance with examples as disclosed herein. In some examples, aspects of the operations of 1005 may be performed by a data processing manager 825 as described with reference to FIG. 8.

At 1010, the method may include simulating, using the corpus of message data, a subset of the withdrawal messages of the plurality of crypto tokens from the one or more outbound addresses. The operations of 1010 may be performed in accordance with examples as disclosed herein. In some examples, aspects of the operations of 1010 may be performed by a withdrawal simulation manager 830 as described with reference to FIG. 8.

At 1015, the method may include determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses. The operations of 1015 may be performed in accordance with examples as disclosed herein. In some examples, aspects of the operations of 1015 may be performed by a ratio determination manager 835 as described with reference to FIG. 8.

Figure 11:
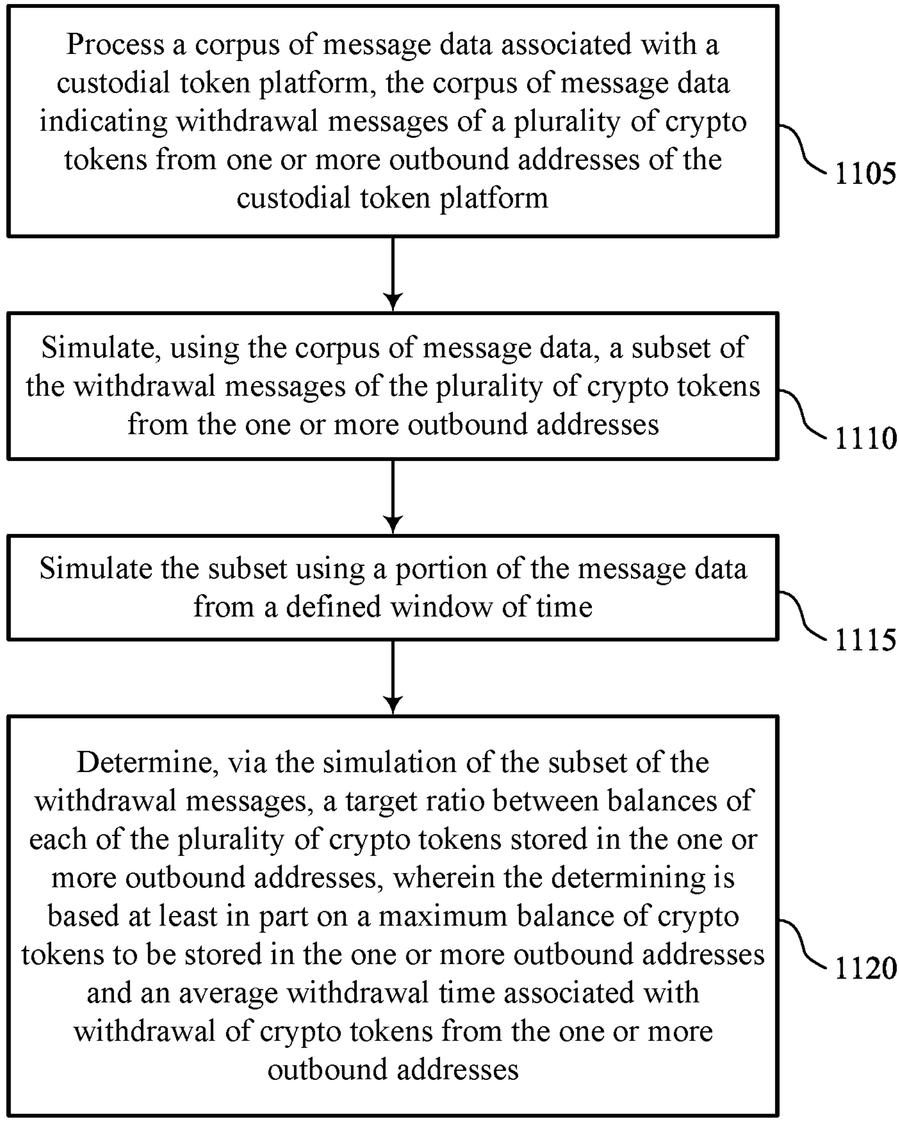

FIG. 11 shows a flowchart illustrating a method 1100 that supports identification of token thresholds using message simulation in accordance with aspects of the present disclosure. The operations of the method 1100 may be implemented by a custodial token platform or its components as described herein. For example, the operations of the method 1100 may be performed by a custodial token platform as described with reference to FIGS. 1 through 9. In some examples, a custodial token platform may execute a set of instructions to control the functional elements of the custodial token platform to perform the described functions. Additionally, or alternatively, the custodial token platform may perform aspects of the described functions using special-purpose hardware.

At 1105, the method may include processing a corpus of message data associated with a custodial token platform, the corpus of message data indicating withdrawal messages of a plurality of crypto tokens from one or more outbound addresses of the custodial token platform. The operations of 1105 may be performed in accordance with examples as disclosed herein. In some examples, aspects of the operations of 1105 may be performed by a data processing manager 825 as described with reference to FIG. 8.

At 1110, the method may include simulating, using the corpus of message data, a subset of the withdrawal messages of the plurality of crypto tokens from the one or more outbound addresses. The operations of 1110 may be performed in accordance with examples as disclosed herein. In some examples, aspects of the operations of 1110 may be performed by a withdrawal simulation manager 830 as described with reference to FIG. 8.

At 1115, the method may include simulating the subset using a portion of the message data from a defined window of time. The operations of 1115 may be performed in accordance with examples as disclosed herein. In some examples, aspects of the operations of 1115 may be performed by a withdrawal simulation manager 830 as described with reference to FIG. 8.

At 1120, the method may include determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses. The operations of 1120 may be performed in accordance with examples as disclosed herein. In some examples, aspects of the operations of 1120 may be performed by a ratio determination manager 835 as described with reference to FIG. 8.

Figure 12:
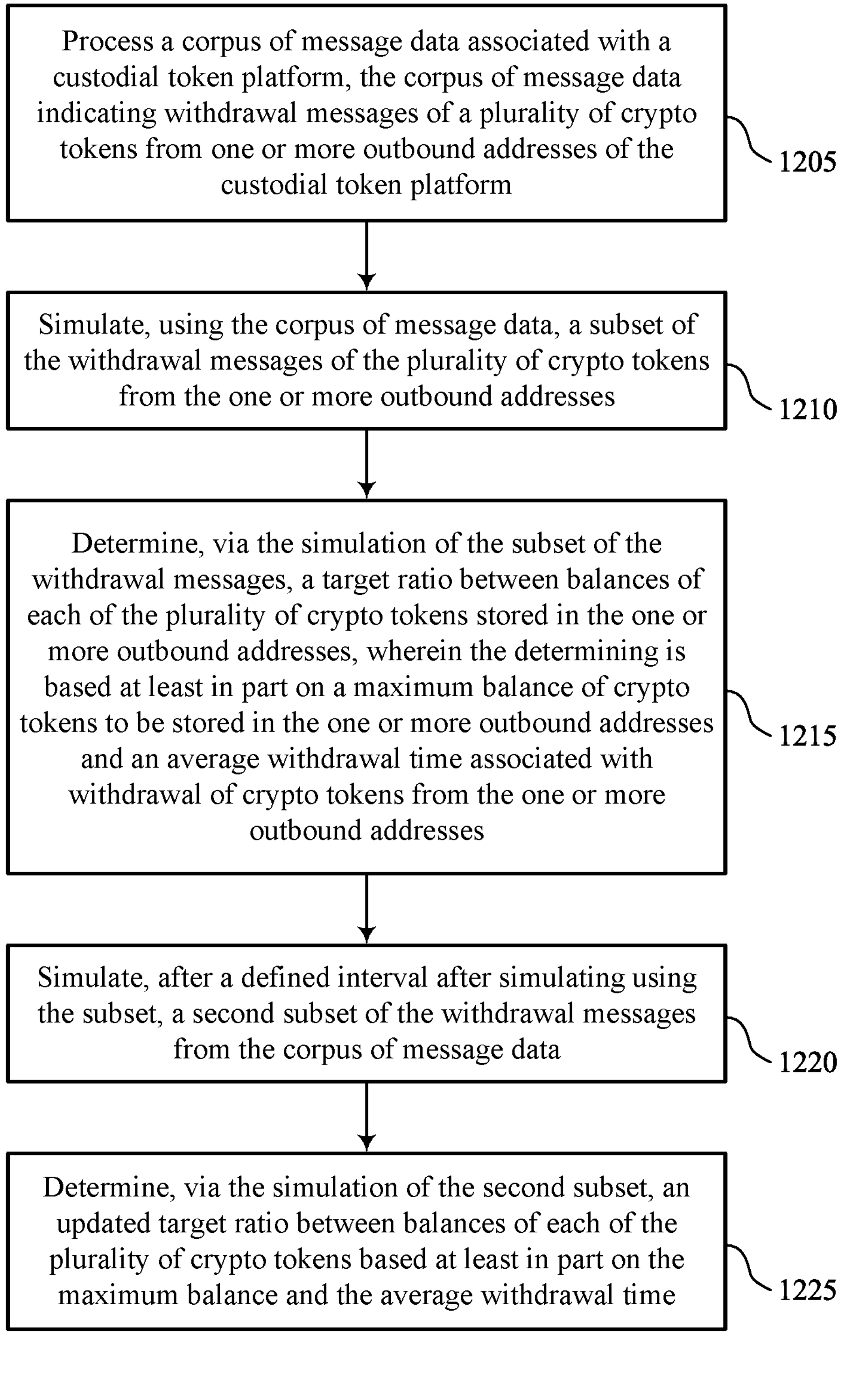

FIG. 12 shows a flowchart illustrating a method 1200 that supports identification of token thresholds using message simulation in accordance with aspects of the present disclosure. The operations of the method 1200 may be implemented by a custodial token platform or its components as described herein. For example, the operations of the method 1200 may be performed by a custodial token platform as described with reference to FIGS. 1 through 9. In some examples, a custodial token platform may execute a set of instructions to control the functional elements of the custodial token platform to perform the described functions. Additionally, or alternatively, the custodial token platform may perform aspects of the described functions using special-purpose hardware.

At 1205, the method may include processing a corpus of message data associated with a custodial token platform, the corpus of message data indicating withdrawal messages of a plurality of crypto tokens from one or more outbound addresses of the custodial token platform. The operations of 1205 may be performed in accordance with examples as disclosed herein. In some examples, aspects of the operations of 1205 may be performed by a data processing manager 825 as described with reference to FIG. 8.

At 1210, the method may include simulating, using the corpus of message data, a subset of the withdrawal messages of the plurality of crypto tokens from the one or more outbound addresses. The operations of 1210 may be performed in accordance with examples as disclosed herein. In some examples, aspects of the operations of 1210 may be performed by a withdrawal simulation manager 830 as described with reference to FIG. 8.

At 1215, the method may include determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses. The operations of 1215 may be performed in accordance with examples as disclosed herein. In some examples, aspects of the operations of 1215 may be performed by a ratio determination manager 835 as described with reference to FIG. 8.

At 1220, the method may include simulating, after a defined interval after simulating using the subset, a second subset of the withdrawal messages from the corpus of message data. The operations of 1220 may be performed in accordance with examples as disclosed herein. In some examples, aspects of the operations of 1220 may be performed by a withdrawal simulation manager 830 as described with reference to FIG. 8.

At 1225, the method may include determining, via the simulation of the second subset, an updated target ratio between balances of each of the plurality of crypto tokens based at least in part on the maximum balance and the average withdrawal time. The operations of 1225 may be performed in accordance with examples as disclosed herein. In some examples, aspects of the operations of 1225 may be performed by a ratio determination manager 835 as described with reference to FIG. 8.

A method for digital token management by an apparatus is described. The method may include processing a corpus of message data associated with a custodial token platform, the corpus of message data indicating withdrawal messages of a plurality of crypto tokens from one or more outbound addresses of the custodial token platform, simulating, using the corpus of message data, a subset of the withdrawal messages of the plurality of crypto tokens from the one or more outbound addresses, and determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses.

An apparatus for digital token management is described. The apparatus may include one or more memories storing processor executable code, and one or more processors coupled with the one or more memories. The one or more processors may individually or collectively operable to execute the code to cause the apparatus to process a corpus of message data associated with a custodial token platform, the corpus of message data indicating withdrawal messages of a plurality of crypto tokens from one or more outbound addresses of the custodial token platform, simulate, using the corpus of message data, a subset of the withdrawal messages of the plurality of crypto tokens from the one or more outbound addresses, and determine, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses.

Another apparatus for digital token management is described. The apparatus may include means for processing a corpus of message data associated with a custodial token platform, the corpus of message data indicating withdrawal messages of a plurality of crypto tokens from one or more outbound addresses of the custodial token platform, means for simulating, using the corpus of message data, a subset of the withdrawal messages of the plurality of crypto tokens from the one or more outbound addresses, and means for determining, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses.

A non-transitory computer-readable medium storing code for digital token management is described. The code may include instructions executable by a processor to process a corpus of message data associated with a custodial token platform, the corpus of message data indicating withdrawal messages of a plurality of crypto tokens from one or more outbound addresses of the custodial token platform, simulate, using the corpus of message data, a subset of the withdrawal messages of the plurality of crypto tokens from the one or more outbound addresses, and determine, via the simulation of the subset of the withdrawal messages, a target ratio between balances of each of the plurality of crypto tokens stored in the one or more outbound addresses, wherein the determining is based at least in part on a maximum balance of crypto tokens to be stored in the one or more outbound addresses and an average withdrawal time associated with withdrawal of crypto tokens from the one or more outbound addresses.

In some examples of the method, apparatus, and non-transitory computer-readable medium described herein, the determining may be based at least in part on the target ratio being associated with a lower average withdrawal time than one or more other ratios between balances of each of the plurality of crypto tokens stored in the one or more outbound addresses.

In some examples of the method, apparatus, and non-transitory computer-readable medium described herein, the message data comprises deposit data, withdrawal data, and price data for each crypto token of the plurality of crypto tokens.

In some examples of the method, apparatus, and non-transitory computer-readable medium described herein, simulating the subset of the withdrawal messages may include operations, features, means, or instructions for simulating the subset using a portion of the message data from a defined window of time.

In some examples of the method, apparatus, and non-transitory computer-readable medium described herein, the defined window of time may be associated with a particular time of year.

Some examples of the method, apparatus, and non-transitory computer-readable medium described herein may further include operations, features, means, or instructions for simulating, after a defined interval after simulating using the subset, a second subset of the withdrawal messages from the corpus of message data and determining, via the simulation of the second subset, an updated target ratio between balances of each of the plurality of crypto tokens based at least in part on the maximum balance and the average withdrawal time.

In some examples of the method, apparatus, and non-transitory computer-readable medium described herein, the target ratio may be updated periodically.

In some examples of the method, apparatus, and non-transitory computer-readable medium described herein, identifying, based at least in part on simulating the subset, an anomaly associated with a first crypto token of the plurality of crypto tokens, wherein the target ratio may be determined using the anomaly.

In some examples of the method, apparatus, and non-transitory computer-readable medium described herein, anomaly comprises a high rate of withdrawals or deposits associated with the first crypto token relative to a rate of withdrawals or deposits for one or more second crypto tokens or one or more prior windows of time.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for digital token management, comprising:

processing a corpus of message data associated with a custodial token platform, the corpus of message data indicating withdrawal messages of a plurality of crypto tokens from one or more outbound addresses of the custodial token platform;

simulating, using the corpus of message data, a subset of the withdrawal messages of the plurality of crypto tokens from the one or more outbound addresses;

determining, via the simulation of the subset of the withdrawal messages, a target ratio between balances of each of the plurality of crypto tokens stored in the one or more outbound addresses, wherein the determining is based at least in part on:

a maximum balance of crypto tokens to be stored in the one or more outbound addresses; and an average withdrawal time associated with withdrawal of crypto tokens from the one or more outbound addresses; and broadcasting, to a blockchain ledger maintained by a plurality of computing nodes and based at least in part on the target ratio, a first transaction that transfers one or more of the plurality of crypto tokens between the one or more outbound addresses and one or more cold storage wallets of the custodial token platform.

2. The method of claim 1, wherein the determining is based at least in part on the target ratio being associated with a lower average withdrawal time than one or more other ratios between balances of each of the plurality of crypto tokens stored in the one or more outbound addresses.

3. The method of claim 1, wherein the message data comprises deposit data, withdrawal data, and price data for each crypto token of the plurality of crypto tokens.

4. The method of claim 1, wherein simulating the subset of the withdrawal messages comprises:
simulating the subset using a portion of the message data from a defined window of time.

5. The method of claim 4, wherein the defined window of time is associated with a particular time of year.

6. The method of claim 1, further comprising:
simulating, after a defined interval after simulating using the subset, a second subset of the withdrawal messages from the corpus of message data; and
determining, via the simulation of the second subset, an updated target ratio between balances of each of the plurality of crypto tokens based at least in part on the maximum balance and the average withdrawal time.

7. The method of claim 6, wherein the target ratio is updated periodically.

8. The method of claim 1, further comprising:
identifying, based at least in part on simulating the subset, an anomaly associated with a first crypto token of the plurality of crypto tokens, wherein the target ratio is determined using the anomaly.

9. The method of claim 8, wherein anomaly comprises a high rate of withdrawals or deposits associated with the first crypto token relative to a rate of withdrawals or deposits for one or more second crypto tokens or one or more prior windows of time.

10. An apparatus for digital token management, comprising:
one or more memories storing processor-executable code; and
one or more processors coupled with the one or more memories and individually or collectively operable to execute the code to cause the apparatus to:
process a corpus of message data associated with a custodial token platform, the corpus of message data indicating withdrawal messages of a plurality of crypto tokens from one or more outbound addresses of the custodial token platform;
simulate, using the corpus of message data, a subset of the withdrawal messages of the plurality of crypto tokens from the one or more outbound addresses;
determine, via the simulation of the subset of the withdrawal messages, a target ratio between balances of each of the plurality of crypto tokens stored in the one or more outbound addresses, wherein the determining is based at least in part on:
a maximum balance of crypto tokens to be stored in the one or more outbound addresses; and
an average withdrawal time associated with withdrawal of crypto tokens from the one or more outbound addresses; and
broadcast, to a blockchain ledger maintained by a plurality of computing nodes and based at least in part on the target ratio, a first transaction that transfers one or more of the plurality of crypto tokens between the one or more outbound addresses and one or more cold storage wallets of the custodial token platform.

11. The apparatus of claim 10, wherein the determining is based at least in part on the target ratio being associated with a lower average withdrawal time than one or more other ratios between balances of each of the plurality of crypto tokens stored in the one or more outbound addresses.

12. The apparatus of claim 10, wherein the message data comprises deposit data, withdrawal data, and price data for each crypto token of the plurality of crypto tokens.

13. The apparatus of claim 10, wherein, to simulate the subset of the withdrawal messages, the one or more processors are individually or collectively operable to execute the code to cause the apparatus to:
simulate the subset using a portion of the message data from a defined window of time.

14. The apparatus of claim 13, wherein the defined window of time is associated with a particular time of year.

15. The apparatus of claim 10, wherein the one or more processors are individually or collectively further operable to execute the code to cause the apparatus to:
simulate, after a defined interval after simulating using the subset, a second subset of the withdrawal messages from the corpus of message data; and
determine, via the simulation of the second subset, an updated target ratio between balances of each of the plurality of crypto tokens based at least in part on the maximum balance and the average withdrawal time.

16. The apparatus of claim 15, wherein:
the target ratio is updated periodically.

17. The apparatus of claim 10, wherein the one or more processors are individually or collectively further operable to execute the code to cause the apparatus to:
identify, based at least in part on simulating the subset, an anomaly associated with a first crypto token of the plurality of crypto tokens, wherein the target ratio is determined using the anomaly.

18. The apparatus of claim 17, wherein anomaly comprises a high rate of withdrawals or deposits associated with the first crypto token relative to a rate of withdrawals or deposits for one or more second crypto tokens or one or more prior windows of time.

19. A non-transitory computer-readable medium storing code for digital token management, the code comprising instructions executable by one or more processors to:
process a corpus of message data associated with a custodial token platform, the corpus of message data indicating withdrawal messages of a plurality of crypto tokens from one or more outbound addresses of the custodial token platform;
simulate, using the corpus of message data, a subset of the withdrawal messages of the plurality of crypto tokens from the one or more outbound addresses;
determine, via the simulation of the subset of the withdrawal messages, a target ratio between balances of each of the plurality of crypto tokens stored in the one or more outbound addresses, wherein the determining is based at least in part on:
a maximum balance of crypto tokens to be stored in the one or more outbound addresses; and
an average withdrawal time associated with withdrawal of crypto tokens from the one or more outbound addresses; and
broadcast, to a blockchain ledger maintained by a plurality of computing nodes and based at least in part on the target ratio, a first transaction that transfers one or more of the plurality of crypto tokens between the one or more outbound addresses and one or more cold storage wallets of the custodial token platform.

20. The non-transitory computer-readable medium of claim 19, wherein the determining is based at least in part on the target ratio being associated with a lower average withdrawal time than one or more other ratios between balances of each of the plurality of crypto tokens stored in the one or more outbound addresses.

* * * * *